United States Patent
Zhang et al.

(10) Patent No.: US 12,244,637 B1
(45) Date of Patent: Mar. 4, 2025

(54) MACHINE LEARNING POWERED CLOUD SANDBOX FOR MALWARE DETECTION

(71) Applicant: Netskope, Inc., Santa Clara, CA (US)

(72) Inventors: Xinjun Zhang, San Jose, CA (US); Ari Azarafrooz, Rancho Santa Margarita, CA (US); Zhenxin Zhan, Fremont, CA (US); Ghanashyam Satpathy, Bangalore (IN); Hung-Ming Chen, Kaohsiung (TW)

(73) Assignee: Netskope, Inc., Santa Clara, CA (US)

( * ) Notice: Subject to any disclaimer, the term of this patent is extended or adjusted under 35 U.S.C. 154(b) by 0 days.

(21) Appl. No.: 18/437,521

(22) Filed: Feb. 9, 2024

(51) Int. Cl.
  *H04L 29/06*    (2006.01)
  *G06F 21/53*    (2013.01)
  *H04L 9/40*     (2022.01)
  *H04L 41/16*    (2022.01)

(52) U.S. Cl.
  CPC .......... *H04L 63/1441* (2013.01); *G06F 21/53* (2013.01); *H04L 41/16* (2013.01)

(58) Field of Classification Search
  CPC ...... G06F 19/707; G06F 21/561; G06F 21/53; H04L 63/145
  See application file for complete search history.

(56) References Cited

U.S. PATENT DOCUMENTS

| | | | |
|---|---|---|---|
| 5,440,723 A | 8/1995 | Arnold et al. | |
| 6,513,122 B1 | 1/2003 | Magdych et al. | |
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |

(Continued)

FOREIGN PATENT DOCUMENTS

| CN | 111274583 A | * | 6/2020 |
|---|---|---|---|
| EP | 1063833 A2 | | 12/2000 |

(Continued)

OTHER PUBLICATIONS

Djenna, Amir, et al. "Artificial intelligence-based malware detection, analysis, and mitigation." Symmetry 15.3 (2023): 677. (Year: 2023).*

(Continued)

*Primary Examiner* — Shawnchoy Rahman

(57) ABSTRACT

A cloud-based network security system (NSS) is described. The NSS uses a sandbox to safely detonate and extract information about a document and uses machine learning algorithms to analyze the information to predict whether the document contains malicious software. Specifically, during the detonation, static and dynamic information about the document is captured in the sandbox as well as character strings from images in the document. The dynamic information (and sometimes the static information) is input to an AI or machine learning model trained to provide an output indicating a prediction of whether the document contains malware. The character strings are compared with a batch of phishing keywords to generate a heuristic score. A validation engine combines the output from the AI or machine learning model and the heuristic score to classify the document as malicious or clean. Security policies can then be applied based on the classification.

20 Claims, 7 Drawing Sheets

(56) References Cited

U.S. PATENT DOCUMENTS

| | | |
|---|---|---|
| 7,735,116 B1 | 6/2010 | Gauvin |
| 7,966,654 B2 | 6/2011 | Crawford |
| 8,000,329 B2 | 8/2011 | Fendick et al. |
| 8,296,178 B2 | 10/2012 | Hudis et al. |
| 8,793,151 B2 | 7/2014 | DelZoppo et al. |
| 8,839,417 B1 | 9/2014 | Jordan |
| 9,177,142 B2 | 11/2015 | Montoro |
| 9,197,601 B2 | 11/2015 | Pasdar |
| 9,225,734 B1 | 12/2015 | Hastings |
| 9,231,968 B2 | 1/2016 | Fang et al. |
| 9,280,678 B2 | 3/2016 | Redberg |
| 9,811,662 B2 | 11/2017 | Sharpe et al. |
| 10,084,825 B1 | 9/2018 | Xu |
| 10,169,579 B1 | 1/2019 | Xu et al. |
| 10,237,282 B2 | 3/2019 | Nelson et al. |
| 10,334,442 B2 | 6/2019 | Vaughn et al. |
| 10,382,468 B2 | 8/2019 | Dods |
| 10,462,173 B1 | 10/2019 | Aziz et al. |
| 10,484,334 B1 | 11/2019 | Lee et al. |
| 10,762,206 B2* | 9/2020 | Titonis ............... H04W 12/128 |
| 10,826,941 B2 | 11/2020 | Jain et al. |
| 11,025,666 B1* | 6/2021 | Han .................... H04L 63/1416 |
| 11,032,301 B2 | 6/2021 | Mandrychenko et al. |
| 11,036,856 B2 | 6/2021 | Graun et al. |
| 11,281,775 B2 | 3/2022 | Burdett et al. |
| 11,310,282 B1* | 4/2022 | Zhang ................ H04L 63/1425 |
| 11,444,951 B1* | 9/2022 | Patil ..................... H04L 63/102 |
| 11,481,709 B1* | 10/2022 | Liao .................. G06Q 10/0635 |
| 2002/0099666 A1 | 7/2002 | Dryer et al. |
| 2003/0055994 A1 | 3/2003 | Herrmann et al. |
| 2003/0063321 A1 | 4/2003 | Inoue et al. |
| 2003/0172292 A1 | 9/2003 | Judge |
| 2003/0204632 A1 | 10/2003 | Willebeek-Lemair et al. |
| 2004/0015719 A1 | 1/2004 | Lee et al. |
| 2005/0010593 A1 | 1/2005 | Fellenstein et al. |
| 2005/0271246 A1 | 12/2005 | Sharma et al. |
| 2006/0156401 A1 | 7/2006 | Newstadt et al. |
| 2007/0204018 A1 | 8/2007 | Chandra et al. |
| 2007/0237147 A1 | 10/2007 | Quinn et al. |
| 2008/0069480 A1 | 3/2008 | Aarabi et al. |
| 2008/0134332 A1 | 6/2008 | Keohane et al. |
| 2009/0144818 A1 | 6/2009 | Kumar et al. |
| 2009/0249470 A1 | 10/2009 | Litvin et al. |
| 2009/0300351 A1 | 12/2009 | Lei et al. |
| 2010/0017436 A1 | 1/2010 | Wolge |
| 2011/0119481 A1 | 5/2011 | Auradkar et al. |
| 2011/0145594 A1 | 6/2011 | Jho et al. |
| 2012/0278896 A1 | 11/2012 | Fang et al. |
| 2013/0159694 A1 | 6/2013 | Chiueh et al. |
| 2013/0298190 A1 | 11/2013 | Sikka et al. |
| 2013/0347085 A1 | 12/2013 | Hawthorn et al. |
| 2014/0013112 A1 | 1/2014 | Cidon et al. |
| 2014/0068030 A1 | 3/2014 | Chambers et al. |
| 2014/0068705 A1 | 3/2014 | Chambers et al. |
| 2014/0259093 A1 | 9/2014 | Narayanaswamy et al. |
| 2014/0282843 A1 | 9/2014 | Buruganahalli et al. |
| 2014/0289852 A1* | 9/2014 | Evans ..................... G06F 21/55 726/23 |
| 2014/0359282 A1 | 12/2014 | Shikfa et al. |
| 2014/0366079 A1 | 12/2014 | Pasdar |
| 2015/0100357 A1 | 4/2015 | Seese et al. |
| 2016/0323318 A1 | 11/2016 | Terrill et al. |
| 2016/0350145 A1 | 12/2016 | Botzer et al. |
| 2017/0064005 A1 | 3/2017 | Lee |
| 2017/0093917 A1 | 3/2017 | Chandra et al. |
| 2017/0250951 A1 | 8/2017 | Wang et al. |
| 2019/0222591 A1* | 7/2019 | Kislitsin ............. H04L 63/1416 |
| 2020/0050686 A1 | 2/2020 | Kamalapuram et al. |
| 2020/0322361 A1* | 10/2020 | Ravindra ............. G06F 40/279 |
| 2023/0297685 A1 | 9/2023 | Patil et al. |
| 2023/0342461 A1 | 10/2023 | Du et al. |

FOREIGN PATENT DOCUMENTS

| | | | | |
|---|---|---|---|---|
| WO | WO-2013184653 A1 * | 12/2013 | ........... | G06F 21/562 |
| WO | WO-2014012106 A2 * | 1/2014 | ............. | G06F 16/13 |
| WO | WO-2022246131 A1 * | 11/2022 | ........... | H04L 43/028 |

OTHER PUBLICATIONS

Singh, Jagsir, and Jaswinder Singh. "Detection of malicious software by analyzing the behavioral artifacts using machine learning algorithms." Information and Software Technology 121 (2020): 106273. (Year: 2020).*

Kishore, Pushkar, Swadhin Kumar Barisal, and Durga Prasad Mohapatra. "JavaScript malware behaviour analysis and detection using sandbox assisted ensemble model." 2020 IEEE Region 10 Conference (Tencon). IEEE, 2020. (Year: 2020).*

U.S. Appl. No. 18/656,895 Non-Final Office Action dated Jul. 5, 2024, USPTO Examiner Fatoumata Traore, 18 pages.

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

Huckaby, Jeff "Ending Clear Text Protocols," Rackaid.com, Dec. 9, 2008, 3 pgs.

Newton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-US/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al., "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54/ .

Zetter, Kim, "Revealed: The Internet's Biggest Security Hole," Wired, Aug. 26, 2008, 13 pgs.

Adya et al., "Farsite: Federated, available, and reliable storage for an incompletely trusted environment," SIGOPS Oper. Syst. Rev. 36, SI, Dec. 2002, pp. 1-14.

Agrawal et al., "Order preserving encryption for numeric data," In Proceedings of the 2004 Acm Sigmod international conference on Management of data, Jun. 2004, pp. 563-574.

Balakrishnan et al., "A layered naming architecture for the Internet," Acm Sigcomm Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html# :~: text=mode of communication.-, What are the different email protocols%3F, and also has defined functions.

NIIT, Special Edition Using Storage Area Networks, Que, 2002, 6 pgs.

Chapple, Mike, "Firewall redundancy: Deployment scenarios and benefits," TechTarget, 2005, 5 pgs. available at https://www.techtarget.com/searchsecurity/tip/Firewall-redundancy-Deployment-scenarios-and-benefits? Offer=abt_pubpro_AI-Insider.

(56) References Cited

OTHER PUBLICATIONS

Fortinet, FortiGate—3600 User Manual (vol. 1, Version 2.50 MR2) Sep. 5, 2003, 329 pgs.
Fortinet, FortiGate SOHO and SMB Configuration Example, (Version 3.0 MR5), Aug. 24, 2007, 54 pgs.
Fortinet, FortiSandbox—Administration Guide, (Version 2.3.2), Nov. 9, 2016, 191 pgs.
Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.
Fortinet, FortiOS- Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/10.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al., "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P. 2000, May 2000, pp. 44-55.
Dean, Tamara, Guide to Telecommunications Technology, Course Technology, 2003, 5 pgs.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.
U.S. Appl. No. 18/656,895 Non-Final Office Action dated Jul. 5, 2024, USPTO Examiner Fatoumata Traore, 18 pages (745.0082).

* cited by examiner

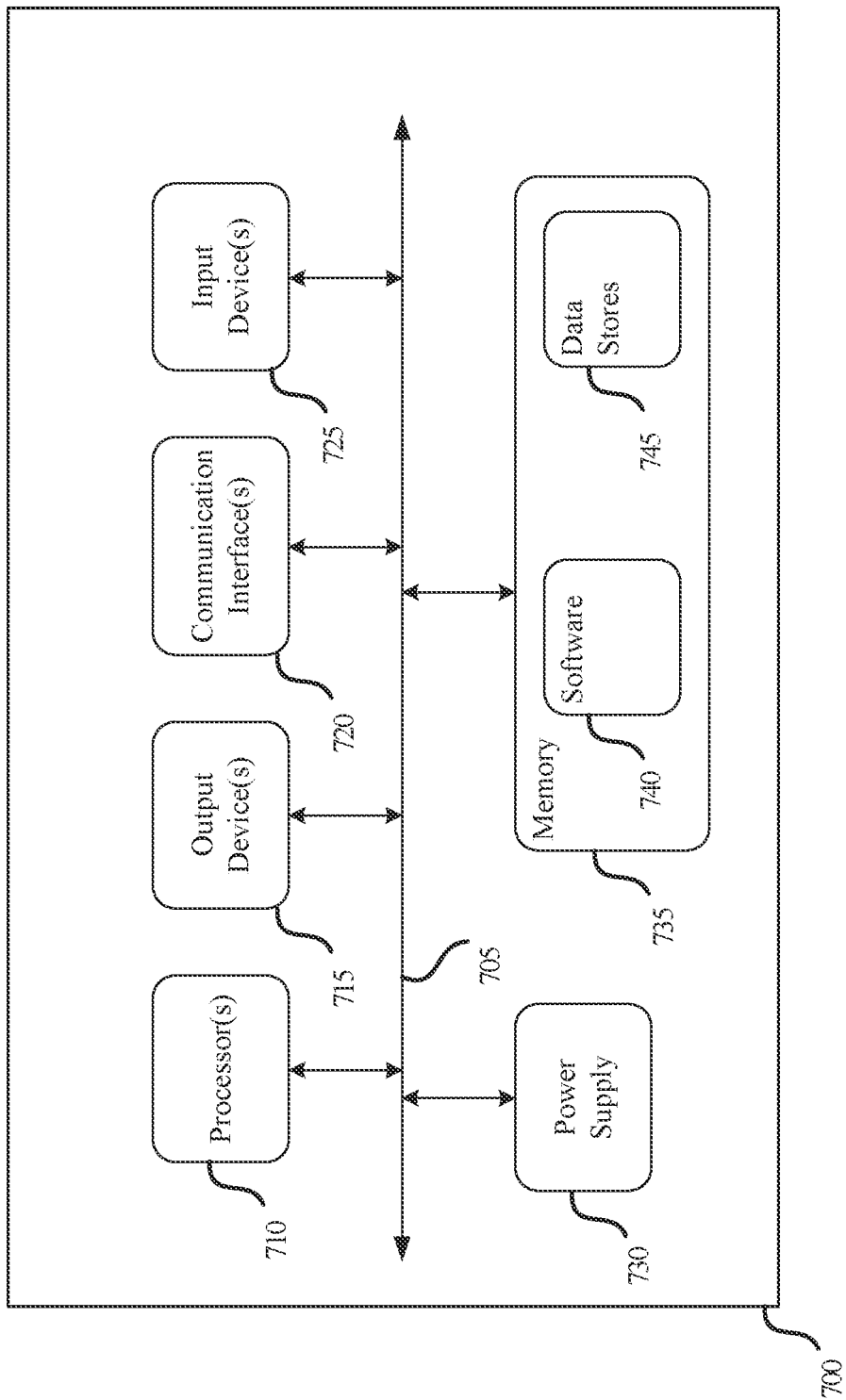

MACHINE LEARNING POWERED CLOUD SANDBOX FOR MALWARE DETECTION

BACKGROUND

Malicious software (i.e., malware) is used by cybercriminals to harm legitimate people and businesses in many ways including interrupting public services, stealing data (e.g., confidential and secure data such as personally identifying information), and stealing financial resources. Cybercriminals and malware are an ever-present issue for any entity utilizing computing technology. Cybercriminals exploit many technologies including everyday types of office documents (e.g., word processing documents, spreadsheet documents, presentation documents, and the like) to deliver malware. These everyday documents represent a large threat to entities, and a favored choice by cybercriminals, because of their widespread usage. Zero-day malware attacks exploit unknown security flaws and vulnerabilities, so cybercriminals often use these everyday documents to deliver zero-day malware. These malicious files present a substantial risk to organizations because they often initiate the first stage of an attack, triggering execution of the malware.

Once a user opens or gains access to an infected document, any malware included in the document is executed. The malware in such a document may initiate the attack by installing unwanted malicious software on the user's device, opening access to otherwise secure data locations, and the like. Existing technologies use strategies such as static or signature-based detections, but these strategies often do not detect stealthy malware hidden in this type of everyday office document. Particularly, zero-day malware is difficult to identify and is not detected using only static or signature-based detections because static and signature-based detections use previously known information about malware to detect the malware. By definition, zero-day malware is previously unknown. Additionally, other novel malware, older malware strains that have been modified, or polymorphic malware (i.e., malware that continually changes to evade detection) are not typically detectable using only static or signature-based detections. Accordingly, improvements are needed to ensure that malware hidden in everyday office documents is detected and contained prior to inadvertent execution by the user.

SUMMARY

To address the limitations described above, a network security system that detonates documents securely in a sandbox is used to analyze the documents and make determinations as to whether the documents are clean or malicious. The system analyzes and extracts static information related to the document (e.g., information about the document itself), dynamic information about the document (e.g., behaviors observed by opening the document) in the sandbox, and character strings from images in the document while accessing the document in the sandbox. The system uses artificial intelligence (AI) models to analyze the dynamic information. The AI models are trained to predict whether the document includes malware. Further, analysis of the character strings provides a heuristic evaluation of whether the document contains malware. A validation engine of the system combines the heuristic evaluation and the output of the AI model to classify the document as malicious or clean. Security policies can then be applied based at least in part on the classification.

In particular, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method that can be performed by a network security system. The network security system intercepts a request to access a document and, in response, obtains the document. The network security system detonates the document in a sandbox. In response to the detonating, the network security system extracts dynamic information about the document and character strings from images in the document during the detonating in the sandbox. The network security system provides the dynamic information about the document as input to an artificial intelligence model trained to provide an output indicating a prediction of whether the document contains malware based on the input (e.g., the static and dynamic information). The network security system also generates a heuristic score based on comparing the character strings extracted from the document to a batch of phishing keywords. The network security system provides the output of the artificial intelligence model and the heuristic score as input to a verdict engine, where the verdict engine combines the output of the artificial intelligence model and the heuristic score to classify the document as either malicious or clean. Based on the classification, the network security system implements a security policy. Other embodiments of this aspect include corresponding computer systems, apparatus, and computer programs recorded on one or more computer storage devices, each configured to perform the actions of the methods.

Implementations may include one or more of the following features. Optionally, extracting the dynamic information about the document may include analyzing behavior of the document during detonation in the sandbox and extracting data from the behavior. The dynamic information may include a set of behavior features of the document exhibited during the detonating, a size of a process tree spawned by the detonating, a signature vector having a dimension for each of a number of known software signatures where the value of each dimension indicates whether the document invoked the software signature in the sandbox, and severity scores for each of the software signatures the document invoked. Optionally, the set of behavior features may include frequently visited files, frequently visited paths, pathways explored by processes in the sandbox, or a combination thereof.

In some embodiments, providing the dynamic information about the document as input may include generating a feature vector representing the dynamic information and providing the feature vector as the input to the artificial intelligence model. In some embodiments, the artificial intelligence model may include a gradient boosting tree algorithm.

In some embodiments, extracting the character strings from the images in the document may include analyzing the document during detonation in the sandbox with optical character recognition. Optionally, the heuristic score may include a count of the matches identified during the comparing of the character strings to the batch of phishing keywords.

Optionally, a heuristic rule is triggered based on the heuristic score exceeding a threshold heuristic value and the output of the artificial intelligence model may include a prediction score indicating the prediction. In such embodiments, the verdict engine classifies the document as malicious based on determining if the heuristic rule is triggered and the prediction score exceeds a pre-defined prediction threshold value. Further, the verdict engine in such embodiments classifies the document as clean based on determining if the heuristic rule is not triggered or the prediction score does not exceed the pre-defined prediction threshold value.

Optionally, the method may further include extracting static information about the document. The static information may be input to the artificial intelligence model with the dynamic information as input, in some embodiments. Implementations of the described techniques may include hardware, a method or process, or computer software on a computer-accessible medium.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 7 illustrates an exemplary computing system, according to some embodiments.

DETAILED DESCRIPTION

Figure 1:
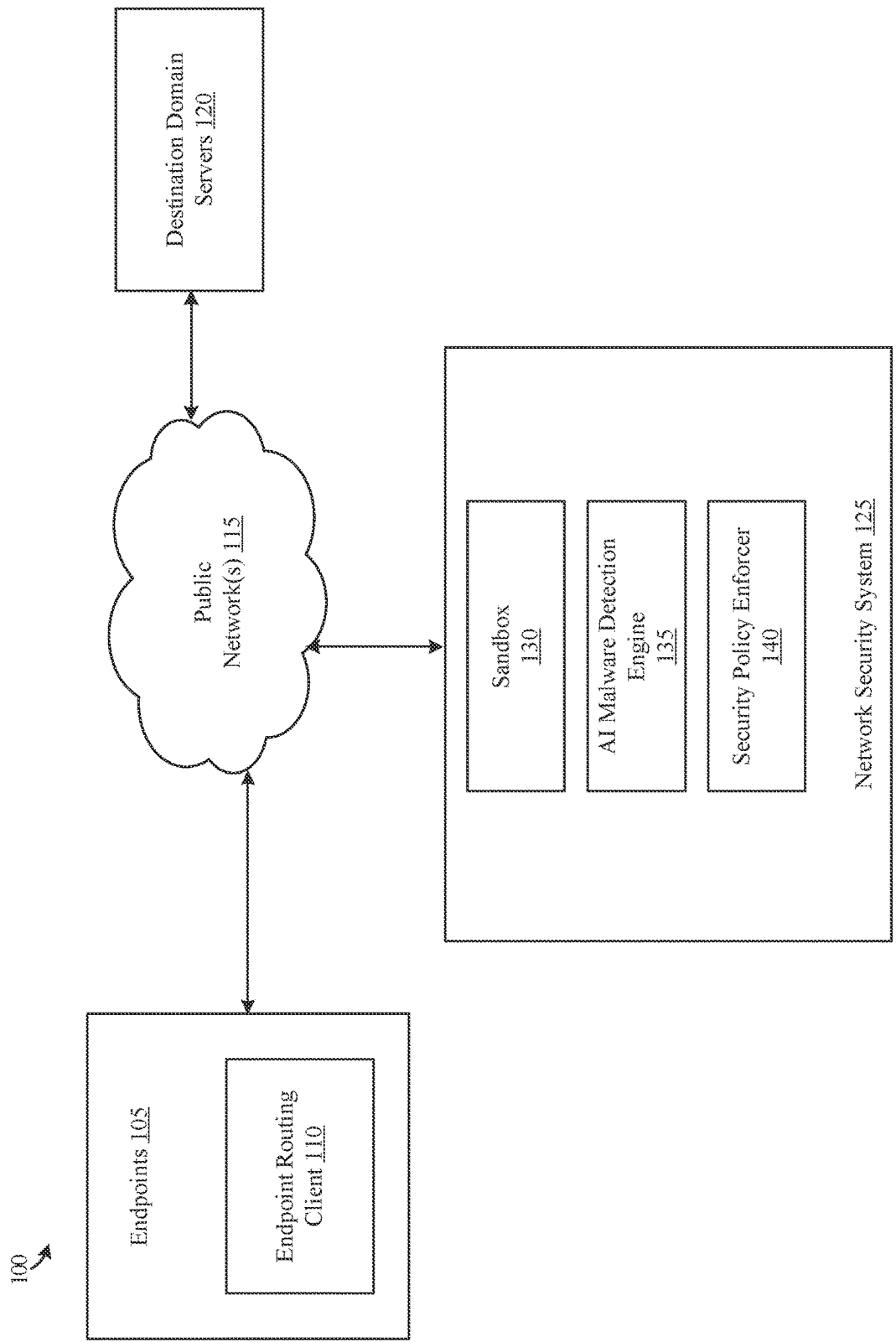
FIG. 1 illustrates a security environment including a network security system that detects malware, according to some embodiments.

To more accurately detect malware in documents, more than simply static or signature-based analysis is used. As discussed above, everyday documents including word processing documents (e.g., MICROSOFT WORD®), presentation documents (e.g., MICROSOFT POWERPOINT®), and spreadsheet documents (e.g., MICROSOFT EXCEL®) are often exploited by cybercriminals to attack individuals and enterprises. These cybercriminals embed malware in the documents or otherwise configure the documents to access and initiate execution of malware on the target computers. Identifying the infected documents prior to execution (e.g., opening the document) on the target computers is ideal but difficult. Existing detection often relies on static or signature-based detection, but cybercriminals are constantly evolving their techniques to evade detection. Further, novel malware including zero-day malware, older malware strains that have been modified, or polymorphic malware (i.e., malware that continually changes to evade detection) are not detectable using standard static or signature-based detection methods.

To increase detection of these types of novel malware and avoid infection to unsuspecting computing devices, the present disclosure includes a cloud-based network security system (NSS) with a document malware detection engine. The document malware detection engine uses a sandbox in which the documents in question are detonated (i.e., opened) and analyzed. Because sandboxes are isolated and secure, detonating the document in the sandbox avoids infection. Nonetheless, the documents can be analyzed to detect many static and dynamic parameters. Additionally, while open in the sandbox, text from images in the document can be analyzed, for example using optical character recognition (OCR) technology. Character strings can be captured based on analysis of the images.

The document malware detection engine includes an artificial intelligence (AI) model trained to analyze the dynamic characteristics captured about the document while it was open in the sandbox. In some embodiments, the static information/characteristics are also included in the AI model analysis. The AI model is trained to analyze the characteristics and make a prediction as to whether the document includes malware. For example, the AI model may provide a score indicating the probability that the document includes malware.

The document malware detection engine includes a heuristic analyzer trained to compare the character strings captured from the images in the document against a list of phishing keywords and phrases. The heuristic analyzer can generate a heuristic score, such that a score exceeding a threshold value may be a heuristic trigger, indicating that the document likely contains malware.

The document malware detection engine includes a validation engine that ingests the heuristic score and the prediction from the AI model to classify the document as either clean or malicious. Once classified by the validation engine, the NSS may apply security policies to the document based on the classification.

Advantageously, the disclosed document malware detection engine uses a sandbox to isolate the document during access to avoid infecting any unsuspecting computing systems while still maintaining the ability to analyze the file. While in the sandbox, the document is analyzed to detect static information (e.g., information not requiring the document to be opened), dynamic information (e.g., information generated and captured by opening the document), and other data embedded in images is analyzed. The AI model trained to analyze the dynamic information (and static information in some embodiments) provides a prediction of whether the document includes malware. Alone, this prediction provides satisfactory results. However, in combination with the heuristic trigger based on the data embedded in images, the detection increases by two-fold in testing. The increased rate of detection reduces infected computing systems and saves computing resources as well as human resources in mitigation of infected computing systems.

FIG. 1 illustrates a security environment 100 used to detect malware in documents. Security environment 100 includes network security system 125 with the features for detecting document malware as described throughout. Security environment 100 includes endpoints 105, public networks 115, destination domain servers 120, and network security system 125. Security environment 100 may include additional computing systems not shown here for ease of description. For example, more endpoints 105, more destination domain servers 120, other computing systems that access public networks 115, and the like may be included.

Endpoints 105 comprise user devices including desktops, laptops, mobile devices, and the like. The mobile devices include smartphones, smart watches, and the like. Endpoints 105 may also include internet of things (IOT) devices. Endpoints 105 may include any number of components including those described with respect to computing device 700 of FIG. 7 including processors, output devices, communication interfaces, input devices, memory, and the like, all not depicted here for clarity. Endpoints 105 may be used to access content (e.g., documents, images, and the like) stored in hosted services and other destination domain servers 120 and otherwise interact with servers and other devices connected to public network 115. Endpoints 105 include endpoint routing client 110. In some embodiments, endpoint routing client 110 may be a client installed on the endpoint 105. In other embodiments, endpoint routing client 110 may be implemented using a gateway that traffic from each endpoint 105 passes through for transmission out of a private or sub-network. While a single endpoint 105 is shown for simplicity, any number of endpoints 105 may be included in security environment 100. Further, multiple endpoints 105 associated each with one of a number of enterprises or clients of network security system 125 may be included. In some embodiments, a number of endpoints 105 associated with an enterprise may connect to a private network (not shown) that uses, for example, a gateway to access public network 115.

Endpoint routing client 110 routes network traffic transmitted from its respective endpoint 105 to the network security system 125. Depending on the type of device for which endpoint routing client 110 is routing traffic, endpoint routing client 110 may use or be a virtual private network (VPN) such as VPN on demand or per-app-VPN that use certificate-based authentication. For example, for some devices having a first operating system, endpoint routing client 110 me be a per-app-VPN may be used or a set of domain-based VPN profiles may be used. For other devices having a second operating system, endpoint routing client 110 me be a cloud director mobile app. Endpoint routing client 110 can also be an agent that is downloaded using e-mail or silently installed using mass deployment tools. As mentioned above, endpoint routing client 110 may be implemented in a gateway through which all traffic from endpoints 105 travels to leave an enterprise network, for example. In any implementation, endpoint routing client 110 routes traffic generated by endpoints 105 to network security system 125.

Public network 115 may be any public network including, for example, the Internet. Public network 115 couples endpoints 105, destination domain servers 120, and network security system 125 such that any may communicate with any other via public network 115. While not depicted for simplicity, public network 115 may also couple many other devices for communication including, for example, other servers, other private networks, other user devices, and the like (e.g., any other connected devices). The communication path can be point-to-point over public network 115 and may include communication over private networks (not shown). In some embodiments, endpoint routing client 110, might be delivered indirectly, for example, via an application store (not shown). Communications can occur using a variety of network technologies, for example, private networks, Virtual Private Network (VPN), multiprotocol label switching (MPLS), local area network (LAN), wide area network (WAN), Public Switched Telephone Network (PSTN), Session Initiation Protocol (SIP), wireless networks, point-to-point networks, star network, token ring network, hub network, Internet, or the like. Communications may use a variety of protocols. Communications can use appropriate application programming interfaces (APIs) and data interchange formats, for example, Representational State Transfer (REST), JavaScript Object Notation (JSON), Extensible Markup Language (XML), Simple Object Access Protocol (SOAP), Java Message Service (JMS), Java Platform Module System, and the like. Additionally, a variety of authorization and authentication techniques, such as username/password, Open Authorization (OAuth), Kerberos, SecureID, digital certificates and more, can be used to secure communications.

Destination domain servers 120 include any domain servers available on public network 115. Destination domain servers 120 may include, for example, hosted services such as cloud computing and storage services, financial services, e-commerce services, or any type of applications, websites, or platforms that provide cloud-based storage or web services. At least some destination domain servers 120 may provide or store documents that endpoints 105 access (e.g., store, manipulate, download, upload, open, or the like).

Network security system 125 may provide network security services to endpoints 105. Endpoint routing client 110 may route traffic addressed to destination domain servers 120 from the endpoints 105 to network security system 125 to enforce security policies. Based on the security policy enforcement, the traffic may then be routed to the addressed destination domain server 120, blocked, modified, or the like. While network security system 125 is shown as connected to endpoints 105 via public network 115, in some embodiments, network security system 125 may be on a private network with endpoints 105 to manage network security on premises. Network security system 125 may implement security management for endpoints 105. The security management may include protecting endpoints 105 from various security threats including data loss prevention (DLP) and other security vulnerabilities including document malware. For simplicity, the features of network security system 125 related to detecting document malware are shown while other security features are not described in detail. Network security system 125 may be implemented as a cloud-based service and accordingly may be served by one or more server computing systems that provide the cloud-based services that are distributed geographically across data centers, in some embodiments. Network security system 125 may be implemented in any computing system or architecture that can provide the described capabilities without departing from the scope of the present disclosure. Network security system 125 may include, among other security features, sandbox 130, AI malware detection engine 135, and security policy enforcer 140. While a single network security system 125 is depicted for simplicity, any number of network security systems 125 may be implemented in security environment 100 and may include multiple instances of sandbox 130, AI malware detection engine 135, and security policy enforcer 140 for handling multiple clients or enterprises on a per/client basis, for example.

Sandbox 130 is a secure, isolated environment in which a document may be detonated (i.e., opened or launched). Sandbox 130 allows the AI malware detection engine 135 to detonate the document securely such that if it contains malware, the malware is contained and does not harm or infect any client computing systems, including endpoints 105. The documents may be any office documents including, for example, word processing documents (e.g., MICROSOFT WORD®), spreadsheet documents (e.g., MICROSOFT EXCEL®), presentation documents (e.g., MICROSOFT POWERPOINT®), or the like. Sandbox 130 isolates all running programs and is configured to have tightly controlled resources so that any malware is contained and does not infect the hosting server. While in the sandbox, static information about the document may be extracted. Further, during detonation, dynamic behaviors of the document can be observed and analyzed. For example, data about files and paths visited, static data about the document, processes spawned by detonation of the document, and the like can be safely obtained. Additionally, character strings can be extracted from images in the document safely. For example, optical character recognition (OCR) can be used to extract the character strings. The extracted and obtained data, including the static information and dynamic behavior data as well as the character strings, can be used by AI malware detection engine 135 to classify the document as clean or malicious as described in further detail throughout.

AI malware detection engine 135 analyzes documents requested by endpoints 105 to determine or predict whether the documents contain malware (i.e., are malicious). AI malware detection engine 135 obtains the requested document from the destination domain server 120 indicated in the access request. Upon obtaining the document, it is detonated in sandbox 130 and its behavior is observed. Static and dynamic data is captured while the document is in and opened in sandbox 130. In some embodiments, a process in sandbox 130 extracts the desired data and provides it to AI malware detection engine 135. For example, the process may generate a report containing the relevant static and dynamic data and provide the report to AI malware detection engine 135. In some embodiments, a data analyzer of AI malware detection engine 135 analyzes the document while it is open in sandbox 130 and extracts the static and dynamic data. In some embodiments, the static data about the document may be obtained outside of sandbox 130 since some static data may be extracted without opening the document. Details of the static and dynamic data that is extracted or obtained is discussed in more detail with respect to FIG. 2. In addition to the static and dynamic data, character strings are extracted based on analyzing images in the document while the document is open in sandbox 130. Those character strings are also provided to the data analyzer. Once the character strings and static and dynamic data is retrieved, AI malware detection engine 135 analyzes details about the data to make a prediction of whether the document contains malware or not. For example, upon receiving the static and dynamic behavior data, AI malware detection engine 135 processes the data to extract relevant data for input to an AI model trained to predict whether the document contains malware. Additionally, a heuristic score may be calculated based on the extracted character strings. The character strings may be compared to a batch of phishing keywords and phrases to generate the heuristic score. AI malware detection engine 135 feeds the heuristic score and the output prediction of the AI model to a validation engine. The validation engine uses the heuristic score and the output prediction to classify the document as either malicious or clean. Additional details of AI malware detection engine 135 are described with respect to FIG. 2.

Security policy enforcer 140 enforces security policies on all outgoing transactions intercepted by network security system 125 from endpoints 105. Security policy enforcer 140 may identify security policies to apply to outgoing transactions based on, for example, the user account that the outgoing transaction originates from, the endpoint 105 (i.e., user device) that the outgoing transaction originates from, the destination server addressed, the type of communication protocol used, the type of transaction (e.g., document download, document upload, login transaction, or the like), data included in the traffic (e.g., data in the packet), or any combination. Further, security policies may be applied based on classification of a document access request by AI malware detection engine 135. For example, if AI malware detection engine 135 classifies a requested document as malicious, security policy enforcer 140 may block the access request. In some embodiments, other security actions may be performed, other security policies may be applied based on the classification, or the like. For example, a notification of the malicious classification may be presented to the user. As another example, if the document is classified as clean, other security policies may be applied. In all cases, security policy enforcer 140 may identify relevant security policies for the outgoing transaction and apply the security policies. The security policies may include document malware specific policies as well as any other security policies implemented by the organization or entity. Accordingly, security policy enforcer 140 may identify and enforce any other security policies (e.g., security policies other than those related to document malware classification). After applying the security policies, the outgoing transaction may be blocked, modified, or transmitted to the destination domain server 120 specified in the outgoing transaction.

In use, endpoint 105 generates an outgoing transaction to a destination domain server 120. Endpoint routing client 110 routes the outgoing transaction to network security system 125. Network security system 125 intercepts the outgoing transaction and determines whether the transaction includes a document access request. If not, the outgoing transaction is routed to security policy enforcer 140. If so, the outgoing transaction is routed to AI malware detection engine 135. AI malware detection engine 135 analyzes the requested document by detonating it in sandbox 130 and extracting relevant information about the behavior of the document. Based on the analysis, AI malware detection engine 135 classifies the document as clean or malicious and provides the classification with the outgoing transaction to security policy enforcer 140. Security policy enforcer 140 enforces relevant security policies, some of which may be related to the document classification. Based on enforcement of the relevant security policies, network security system 125 may block the outgoing transaction, modify the outgoing transaction, or transmit the outgoing transaction to the addressed destination domain server 120.

Figure 2:
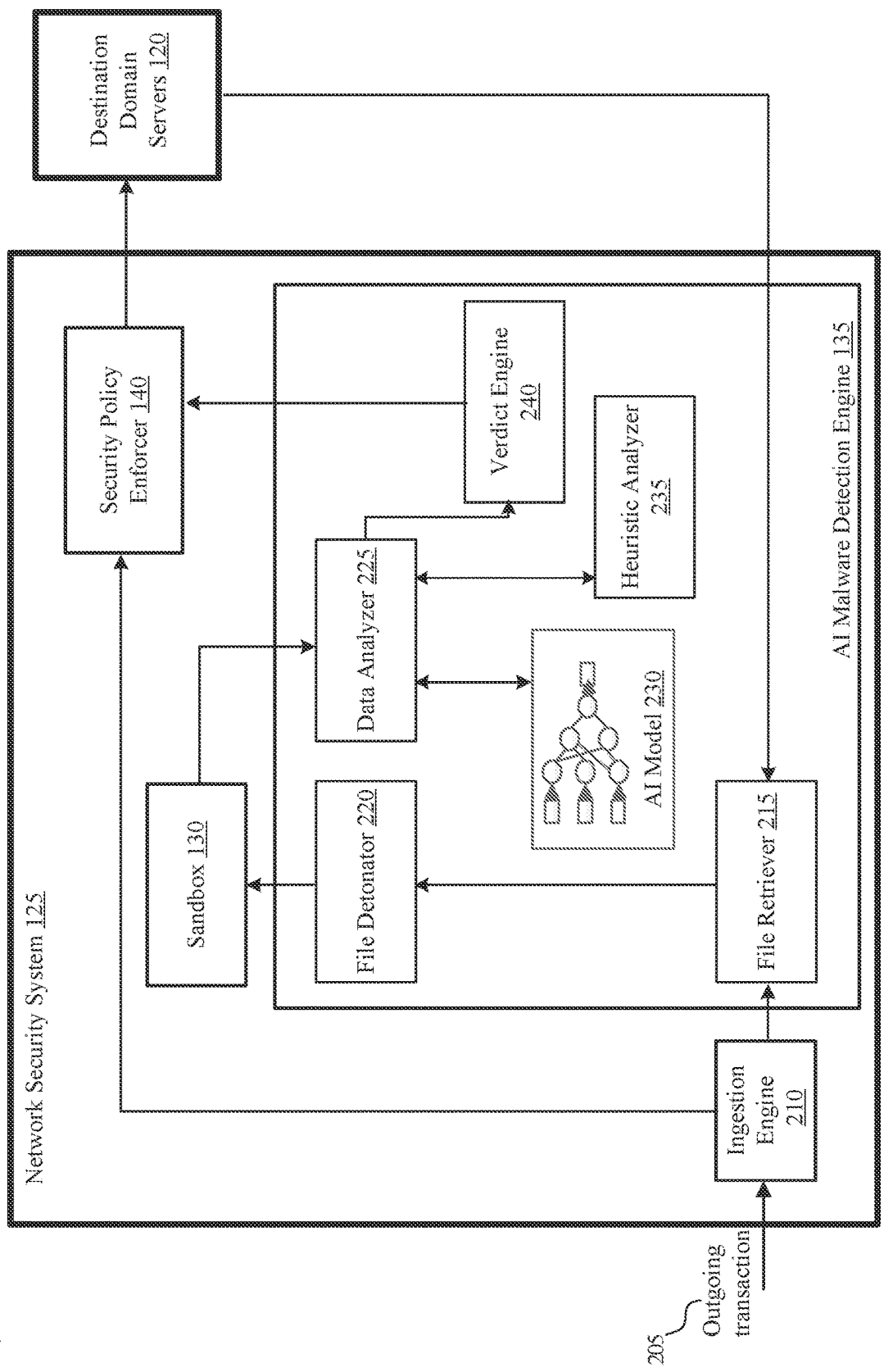
FIG. 2 illustrates additional details of the network security system of FIG. 1, according to some embodiments.

FIG. 2 illustrates additional details of network security system 125. Network security system 125 includes ingestion engine 210, sandbox 130, security policy enforcer 140, and AI malware detection engine 135. AI malware detection engine 135 includes file retriever 215, file detonator 220, data analyzer 225, AI model 230, heuristic analyzer 235, and verdict engine 240. Network security system 125 may include additional components not shown here for case of description of the document malware detection feature. Further, while specific components are depicted (e.g., AI malware detection engine 135, file retriever 215, file detonator 220, data analyzer 225, AI model 230, heuristic analyzer 235, and verdict engine 240) to describe the document malware detection features of network security system 125, the document malware detection functionality described may be incorporated into more or fewer components, software components, hardware components, firmware components, or a combination without departing from the scope and spirit of the present disclosure.

Destination domain servers 120, network security system 125, sandbox 130, and security policy enforcer 140 remain as described with respect to FIG. 1. AI malware detection engine 135 includes file retriever 215, file detonator 220, data analyzer 225, AI model 230, heuristic analyzer 235, and verdict engine 240. While AI malware detection engine 135 depicts the specific components for ease of description, the functionality described for detecting malware in documents may be provided in more or fewer components including distributed components, software components, firmware components, hardware components, or a combination thereof without departing from the spirit and scope of the present disclosure.

Ingestion engine 210 receives outgoing transaction 205 as it arrives based on being routed from endpoint routing client 110. As outgoing transactions are routed to network security system 125, ingestion engine 210 receives each outgoing transaction 205. Ingestion engine 210 may perform various filtering processes depending on the outgoing transaction 205. For the purposes of detecting document malware, ingestion engine 210 may determine whether outgoing transaction 205 includes a document access request. For example, ingestion engine 210 may review packet header information to determine the destination domain server 120 to which outgoing transaction 205 is directed. Based, for example, on the destination domain server 120 being a document storage service, ingestion engine 210 may determine outgoing transaction 205 includes a document access request. As another example, ingestion engine 210 may analyze the payload of outgoing transaction 205 to determine outgoing transaction 205 includes a document access request. In any case, upon determining outgoing transaction 205 includes a document access request, ingestion engine 210 sends outgoing transaction 205 to AI malware detection engine 135. If, however, ingestion engine 210 determines outgoing transaction 205 does not include a document access request, ingestion engine 210 routes outgoing transaction 205 directly to security policy enforcer 140.

File retriever 215 is responsible for obtaining a copy of the target document to which the user requested access. File retriever 215 receives outgoing transaction 205 from ingestion engine 210 when ingestion engine 210 routes outgoing transaction 205 to AI malware detection engine 135. In some embodiments, if ingestion engine 210 determined the file location of the document requested, the file location may be provided separately with outgoing transaction 205 from ingestion engine 210 so that file retriever 215 need not repeat the analysis of outgoing transaction 205. Otherwise, file retriever 215 analyzes outgoing transaction 205 to determine where the requested document is located. Upon determining the file location, file retriever 215 requests the document from destination domain server 120. In some embodiments, file retriever 215 generates a request to download the document using user login credentials from the user associated with outgoing transaction 205. File retriever 215 obtains the document from destination domain server 120 and provides the document to file detonator 220.

File detonator 220 is responsible for detonating (i.e., opening) the document in sandbox 130. File detonator 220 receives the document from file retriever 215. Upon receipt, file detonator 220 may configure sandbox 130 as needed for accessing the document. Note that many outgoing transactions 205 may be analyzed simultaneously. Accordingly, a specific sandbox 130 is configured to open each document in its own, isolated sandbox 130. File detonator 220 may, for example, configure settings, parameters, or the types of data to be captured, and in some embodiments the settings, parameters and types of data are configured based on the type of file. Once sandbox 130 is configured, file detonator 220 opens the document in sandbox 130.

Data analyzer 225 is responsible for distributing the retrieved data from the document to the relevant components so that AI malware detection engine 135 generates a classification for the document. In some embodiments, data analyzer 225 analyzes the document while it is open in sandbox 130. Data analyzer 225 may use, for example, optical character recognition (OCR) to analyze the images in the document to extract any character strings or text in the images. Further, data analyzer 225 may obtain other static and dynamic data from the document while it is opened in sandbox 130. In some embodiments, data analyzer 225 may extract the static data from the document outside of sandbox 130. In some embodiments, processes within sandbox 130 may obtain the static and dynamic data from the document in sandbox 130 as well as perform the OCR to analyze the images in the document. In such embodiments, sandbox 130 may include a process that generates a report that includes all the extracted, observed, identified, and captured data about the document while in sandbox 130. In any case, data analyzer 225 obtains the dynamic data from opening (i.e., executing or detonating) the document in sandbox 130. If processes within sandbox 130 capture the static and dynamic data as well as the character strings from the OCR analysis, the processes may generate a report and send the report or store the report as well as the character strings to a specific destination folder on network security system 125. Data analyzer 225 can retrieve the report and character strings from the destination folder or otherwise obtain the report and character strings from sandbox 130.

Data analyzer 225 may generate a feature vector using the relevant static and dynamic data captured in sandbox 130 to provide to AI model 230. Static data may include the number of pages in the document, the last saved by name, the author, the title, the creation time, keywords, template information, and the like. Some static data may be identified without opening the document, and static data generally represents information (including current information) about the document. Dynamic information is described further below and represents data that may represent behaviors of the document that are identified upon opening the document. The feature vector generated by data analyzer 225 may include, for example, a dimension including a count of behavior features that were exhibited by the document when opened in sandbox 130. A selection of features that may be included in the count may include, for example: apistats, dll_loaded, regkey_opened, regkey_read, regkey_written, regkey_deleted, file_loaded, directory_enumerated, file_exists, file_opened, file_deleted, file_moved, file_created, file_failed, file_written, file_copied, file_recreated, file_read, mutex, command_line, guid, wmi_query, directory_created, directory_removed, resolves_host, connects_ip, connects_host, downloads_file, fetches_url. In some embodiments, some features may be determined to have a higher relevance, so those may be weighted by counting for more value in the count, for example. The following table includes further explanation of each of the behavior features listed above.

| Behavior Name | Explanation |
| --- | --- |
| apistats | Statistics about the API that are called by the document (e.g., by malware in the document) |
| dll_loaded | Loaded dynamic link library files |
| regkey_opened | A list of regkey names which were opened by the document (e.g., by malware in the document) |
| regkey_read | A list of regkey names which were read by the document (e.g., by malware in the document) |
| regkey_written | A list of regkey names which were written by the document (e.g., by malware in the document) |
| regkey_deleted | A list of regkey names which were deleted by the document (e.g., by malware in the document) |
| file_loaded | A list of file paths/names which were loaded by the document (e.g., by malware in the document) |
| directory_enumerated | A list of file directories whose files or subdirectories were enumerated by the document (e.g., by malware in the document) |
| file_exists | A list of file paths/names which were checked if existing by the document (e.g., by malware in the document) calling NtCreateFile function |
| file_opened | A list of file paths/names which were opened by the document (e.g., by malware in the document) calling NtCreateFile function |
| file_deleted | A list of file paths/names which were deleted by the document (e.g., by malware in the document) calling NtCreateFile function |
| file_moved | A list of file paths/names which were moved by the document (e.g., by malware in the document) calling NtCreateFile function |
| file_created | A list of file paths/names which were created by the document (e.g., by malware in the document) calling NtCreateFile function |
| file_failed | A list of file paths/names which failed to open (e.g., file does not exist) by the document (e.g., by malware in the document) calling NtCreateFile function |
| file_written | A list of file paths/names which were written by the document (e.g., by malware in the document) calling NtCreateFile function |
| file_copied | A list of file paths/names which were copied by the document (e.g., by malware in the document) calling NtCreateFile function |
| file_recreated | A list of file paths/names which were overwritten by the document (e.g., by malware in the document) calling NtCreateFile function |
| file_read | A list of file paths/names which were successfully read by the document (e.g., by malware in the document) calling NtCreateFile function |
| mutex | A list of mutex names created by the document (e.g., by malware in the document) calling NtCreateMutant function. Mutual exclusion (mutex) is a program object that prevents multiple threads from accessing the same shared resource simultaneously. |
| command_line | A list of full names of commands created by the document (e.g., by malware in the document) |
| guid | Globally Unique Identifier (GUID). A list of guid which the document (e.g., by malware in the document) created and default-initialized |
| wmi_query | A list of query commands called by the document (e.g., by malware in the document) using a method to retrieve objects |
| directory_created | A list of file directories which were created by the document (e.g., by malware in the document) |
| directory_removed | A list of file directories which were deleted by the document (e.g., by malware in the document) |
| resolves_host | A list of host names or IP addresses which were resolved by the document (e.g., by malware in the document) using the DnsQuery function. DnsQuery is a generic query interface to the DNS namespace and provides a DNS query resolution interface. |
| connects_ip | A list of IP addresses which were connected by the document (e.g., by malware in the document) |
| connects_host | A list of website domain names to which the document (e.g., malware in the document) opens a file transfer protocol (FTP) or hypertext transfer protocol (HTTP) session |
| downloads_file | A list of files which the document (e.g., malware in the document) downloads bits from connected domains and saves them to a file |
| fetches_url | A list of uniform resource locators (URLs) either FTP or HTTP which the document (e.g., malware in the document) opens a resource through an internet session |

The feature vector may include a count of the behavior features exhibited by the document, a dimension for each behavior feature indicating whether it was exhibited by the document, or otherwise represent the behavior features exhibited by the document in the feature vector.

Additionally, data analyzer 225 may include a dimension in the feature vector representing the process tree. For example, a value indicating the size of the process tree may be used as a dimension. The size of the process tree may be determined based on the number of processes and subprocesses that are spawned in response to opening the document. For example, process A may create children processes B and C, and child process C may create a child process D. In this case, the size of the process tree is four (4).

Data analyzer 225 may include one or more dimensions representing frequently visited files and paths of the document. For example, malicious documents may access (e.g., load, read, open delete, or the like) some directories or files which are less frequently accessed by benign documents. To fully analyze this behavior, the dynamic data may include particular information about frequently visited files and paths. The training associated with this dimension of the feature vector is described in more detail with respect to FIG. 6. For example, previously identified files and paths associated with malware may be identified and previously identified files and paths associated with benign documents may be identified. Behavior features associated with those particular files and paths may further be identified. One or more dimensions of the feature vector may provide information regarding those behaviors and features exhibited by the document and associated with the previously identified files and paths. For example, if a first directory path is previously identified as associated with malware, particularly with respect to a subset of the behavior features (described above), they may be used to train AI model 230. On detonation of a file associated with outgoing transaction 205, the dynamic data obtained by data analyzer 225 may be used to determine, for example, a count of the behavior features associated with the relevant path that were exhibited by the document. In some embodiments, that count may be provided as a dimension of the feature vector. In other embodiments, the information can be provided in other ways as dimensions in the feature vector. Accordingly, particular information about document behavior associated with known frequently visited paths and files for malware and benign documents can be extracted and provided as a dimension in the feature vector.

Data analyzer 225 further includes signature related features associated with the document that are captured during detonation of the document in sandbox 130. For example, a one-hot vector having a dimension for each of a number of known signatures may be included in the feature vector. Each dimension may have a value of zero (0) or one (1) indicating whether or not the specific signature was invoked by the document detonation in sandbox 130. Each known signature may have a known severity score. In some embodiments, the severity scores for each invoked signature can be summed to provide a total severity score as a dimension in the feature vector.

After analyzing the data from sandbox 130, data analyzer 225 generates the feature vector as discussed above and submits it to AI model 230. AI model 230 is trained (as discussed in more detail with respect to FIGS. 5 and 6) to predict whether the document contains malware or not. For example, AI model 230 may provide a threat score such that the higher the threat score, the more likely the document includes malware. AI model 230 provides the threat score back to data analyzer 225.

As previously discussed, data analyzer 225 may also obtain character strings, for example using OCR, from images in the document while it was open in sandbox 130. Data analyzer 225 provides the character strings to heuristic analyzer 235. Heuristic analyzer 235 may analyze the character strings by, for example, comparing the character strings to a batch of known phishing keywords and/or phrases to identify matches. In some embodiments, partial matches may be included. In some embodiments, a count of the matches may be used to generate a heuristic score. In some embodiments, partial matches are used and may be weighted to account for a smaller portion of the score than a complete or exact match. Heuristic analyzer 235 may return a heuristic score in some embodiments. In other embodiments, heuristic analyzer 235 may determine whether to indicate a heuristic trigger based on a heuristic rule, for example, the heuristic score exceeding a threshold value. In other words, the heuristic rule may be triggered if sufficient matches to known phishing keywords and phrases are identified in images within the document. The result (e.g., a heuristic trigger, a heuristic score, a true or false indicator, or the like) from heuristic analyzer 235 is returned to data analyzer 225. Data analyzer 225 provides the heuristic analyzer 235 result and the output from AI model 230 to verdict engine 240.

Verdict engine 240 is responsible for classifying the document as clean or malicious. For example, upon receipt of the heuristic score and the threat score from AI model 230, verdict engine 240 may combine the two values to classify the document. In some embodiments, based on the threat score exceeding a threshold threat value and the heuristic score exceeding a threshold heuristic value, verdict engine 240 classifies the document as malicious. In some embodiments, upon receiving a prediction from AI model 230 that the document includes malware and the heuristic trigger having been triggered, verdict engine 240 classifies the document as malicious. In other words, when both AI model 230 indicates malware and heuristic analyzer 235 indicates malware, verdict engine 240 may classify the document as malicious. Similarly, if verdict engine 240 receives a threat value from AI model 230 that is below a threshold threat value and a heuristic score that is below a threshold heuristic value, verdict engine 240 may classify the document as clean. Further, if either AI model 230 or heuristic analyzer 235 indicates no malware (e.g., one or the other returns a score falling below the respective threshold value), verdict engine 240 may classify the document as clean. In other words, unless both AI model 230 and heuristic analyzer 235 indicate malware in the document, the document is classified by verdict engine 240 as clean. After classification, verdict engine 240 provides outgoing transaction 205 and the classification to security policy enforcer 140.

Security policy enforcer 140 enforces security policies on outgoing transaction 205 based at least in part on the classification from verdict engine 240. For example, if the document is classified as malicious, outgoing transaction 205 may be blocked, a notification may be sent to the user, the document may be quarantined, a notification may be sent to administrators, or the like. Further, any combination of security policies may be applied. If the document is classified as clean, security policies may be applied including forwarding outgoing transaction 205 to the destination domain server 120, limiting the user's ability to share, modify, or delete the document based on user privileges, or the like.

Figure 3:
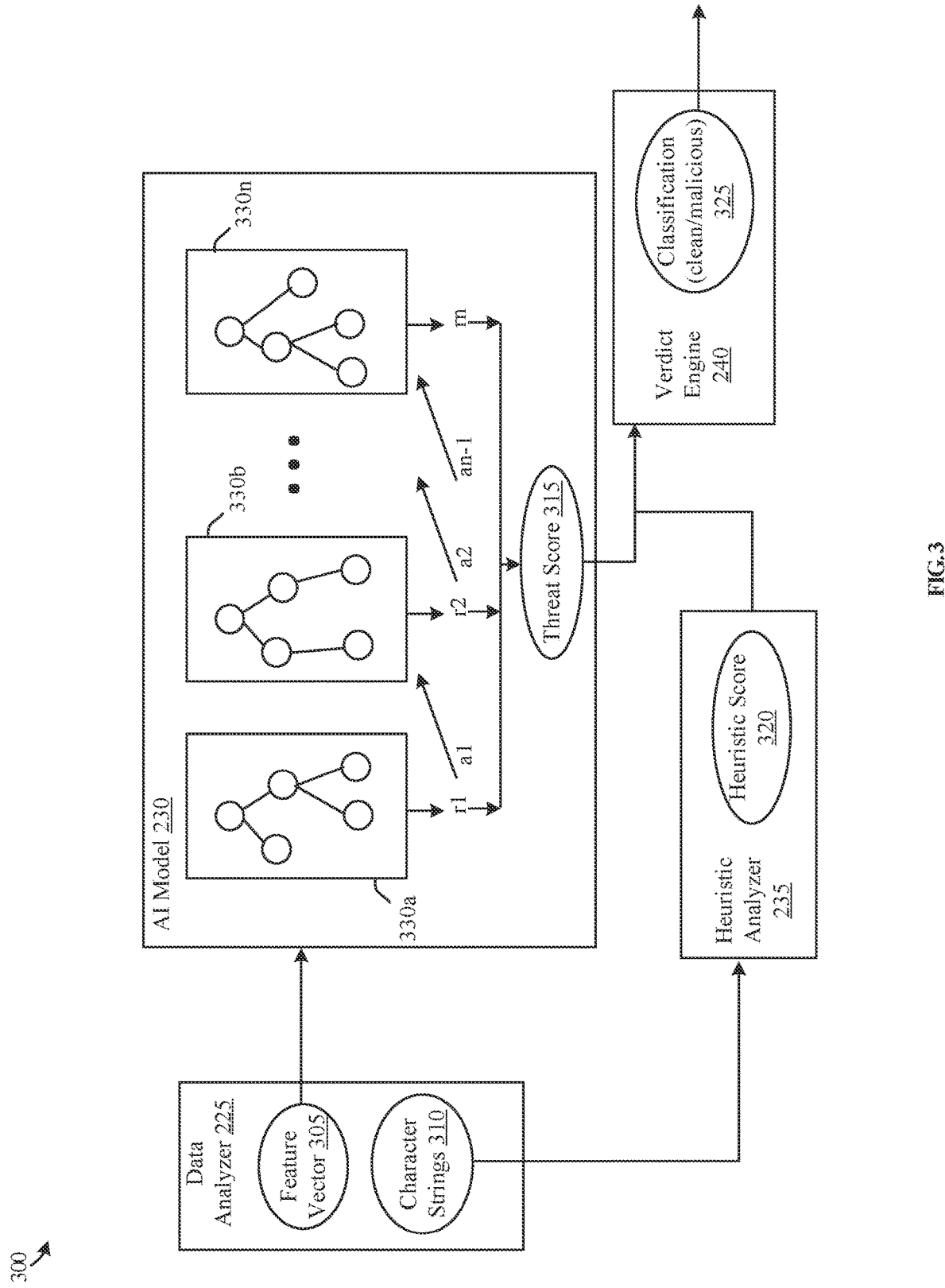
FIG. 3 illustrates a data flow for predicting whether a document is malicious or clean, according to some embodiments.

FIG. 3 illustrates a data flow 300 of data in portions of the AI malware detection engine 135. To begin, as described with respect to FIG. 2, data analyzer 225 uses the data extracted during document detonation in sandbox 130 to generate a feature vector 305. Data analyzer 225 inputs the feature vector 305 to AI model 230. Feature vector 305 may be a five hundred and twelve (512) dimension feature vector in some embodiments, though any number of dimensions may be used. The dimensions correspond to dimensions determined to generate a most accurate prediction of whether the document includes malware based on testing and training. For example, the behavior features described in the table above that are exhibited by the document may be included in feature vector 305. For example, a count of the behavior features exhibited by the document may be included as a dimension of feature vector 305. In some embodiments, a dimension for each behavior feature may be included in feature vector 305 such that each behavior feature is either indicated as exhibited or not exhibited by the value of the dimension (e.g., zero (0) for not exhibited and one (1) for exhibited). Another dimension may include the size of the process tree spawned by the document in sandbox 130. Further dimensions may include frequently visited paths or files information. For example, as described in more detail with respect to FIGS. 5 and 6, AI model 230 may be trained based on previously identified frequently visited paths or files information. This training may identify and use a first selection of frequently visited files and paths for malicious documents and a second selection of frequently visited files and paths for clean documents. Further, a first set of the behavior features exhibited relevant to the frequently visited files and paths of malicious files are identified, and a second set of the behavior features exhibited relevant to the frequently visited files and paths of clean files are identified and used during training. During use, a count of the first set of behavior features exhibited by the document with respect to the known frequently visited files and paths of malicious files may be included as a dimension. Also, a count of the second set of behavior features exhibited by the document with respect to the known frequently visited files and paths of clean files may be included as a dimension. Other dimensions may include indications of signatures invoked by the document. For example, a listing of specific signatures may be relevant. There are many known signatures, and a subset of the known signatures may be used, or all known signatures may be used. In some embodiments, a one-hot vector having a dimension for each relevant signature may be generated in which the one-hot vector includes a zero for each dimension corresponding to a signature that was not invoked by the document and a one for each dimension corresponding to a signature that was invoked by the document. The one-hot vector can be included in feature vector 305. For example, each dimension of the one-hot vector may correspond to a dimension in feature vector 305. Another dimension may indicate the severity of the invoked signatures. Each signature is associated with a severity score. The sum of the severity scores for each invoked signature may be calculated, and a dimension of feature vector 305 may be the sum of the severity scores. Further details of feature vector 305 including the dimensions and how they are selected to train AI model 230 are discussed with respect to FIGS. 2, 5, and 6.

AI model 230 may be or use a gradient boosting tree algorithm (e.g., extreme Gradient Boosting (XGBoost)). AI model 230 may include trees 330a, 330b, and 330n (collectively referred to as trees 330) indicating that there may be any number of trees 330. In some embodiments, AI model 230 includes one hundred forty (140) decision trees having a maximum depth of sixteen (16). AI model 230 uses trees 330 to generate threat score 315. The details of how gradient boosting tree algorithms work are not described in detail here as they are known in the art. However, further details of how AI model 230 is trained specifically to generate threat score 315 are described with respect to FIGS. 5 and 6.

Data analyzer 225 further obtains character strings 310. Character strings 310 may represent data extracted from the document while it was open in sandbox 130. For example, optical character recognition may be used to analyze images in the document to extract text from the images. Other character strings may be extracted from the document as well including from metadata or plain text in the document. The selection of character strings 310 are sent by data analyzer 225 to heuristic analyzer 235.

Heuristic analyzer 235 may include a batch of known phishing keywords, phrases, or a combination thereof. Heuristic analyzer 235 may compare each of the character strings 310 to the batch of known phishing keywords and phrases. Each match may be counted to generate a score. For example, each match may increase the score by one (1). In some embodiments, partial matches may be included. In some embodiments, partial matches may count for less in the score than exact matches. In some embodiments, the score may be used as heuristic score 320. In other embodiments, the score may be used to determine whether it exceeds a threshold heuristic value. If the score exceeds the threshold heuristic value, it may be considered a heuristic trigger, and heuristic score 320 may indicate a binary value (e.g., zero (0) for no heuristic trigger and one (1) for the heuristic trigger). In either case, heuristic score 320 is generated by heuristic analyzer 235.

Threat score 315 generated by AI model 230 and heuristic score 320 generated by heuristic analyzer 235 are provided to verdict engine 240. In some embodiments, AI model 230 sends threat score 315 and heuristic analyzer 235 sends heuristic score 320 directly to verdict engine 240. In some embodiments, AI model 230 sends threat score 315 and heuristic analyzer 235 sends heuristic score 320 back to data analyzer 225, and data analyzer 225 sends both to verdict engine 240. In either case, verdict engine 240 receives threat score 315 and heuristic score 320. Verdict engine 240 combines threat score 315 and heuristic score 320 to generate classification 325, classifying the document as either clean or malicious. Verdict engine 240 may be an AI classifier that takes the threat score 315 and the heuristic score 320 as input and outputs a classification. Verdict engine 240 may, in some embodiments, be a simpler algorithm that determines whether there is a heuristic trigger. The heuristic trigger may either be determined by heuristic analyzer 235 and indicated by heuristic score 320 being a positive value (e.g., one (1)), indicating the heuristic trigger, or verdict engine 240 may determine whether the heuristic trigger is positive by comparing the heuristic score 320 to a threshold heuristic value. In either case, a rule may be used to determine whether the heuristic trigger happened with respect to the document. Further, verdict engine 240 may compare threat score 315 against a threshold threat value such that when the threat score 315 exceeds the threshold threat value it indicates that the document includes malware. Verdict engine 240 may classify the document as malicious when the heuristic trigger happens and the threat score 315 indicates the document includes malware (e.g., threat score 315 exceeds the threshold threat value). Otherwise, verdict engine 240 may classify the document as clean. In other words, both heuristic analyzer 235 and AI model 230 may need to indicate the document includes malware for verdict engine 240 to classify the document as malicious. In other embodiments, verdict engine may classify the document as clean when both AI model 230 and heuristic analyzer 235 indicate the document does not include malware and otherwise classify the document as malicious. In yet other embodiments, when threat score 315 falls within an intermediate range, heuristic score 320 may determine the classification (e.g., when the heuristic trigger does not happen, the document is classified as clean and when the heuristic trigger does happen, the document is classified as malicious). In such embodiments when threat score 315 falls below the intermediate range the document is classified as clean and when threat score 315 falls above the intermediate range the document is classified as malicious. As can be seen, verdict engine 240 may combine threat score 315 and heuristic score 320 in any way to classify the document as clean or malicious.

Upon completing analysis, verdict engine 240 generates classification 325 and sends it to security policy enforcer 140 for security policy enforcement of the outgoing transaction 205.

Figure 4:
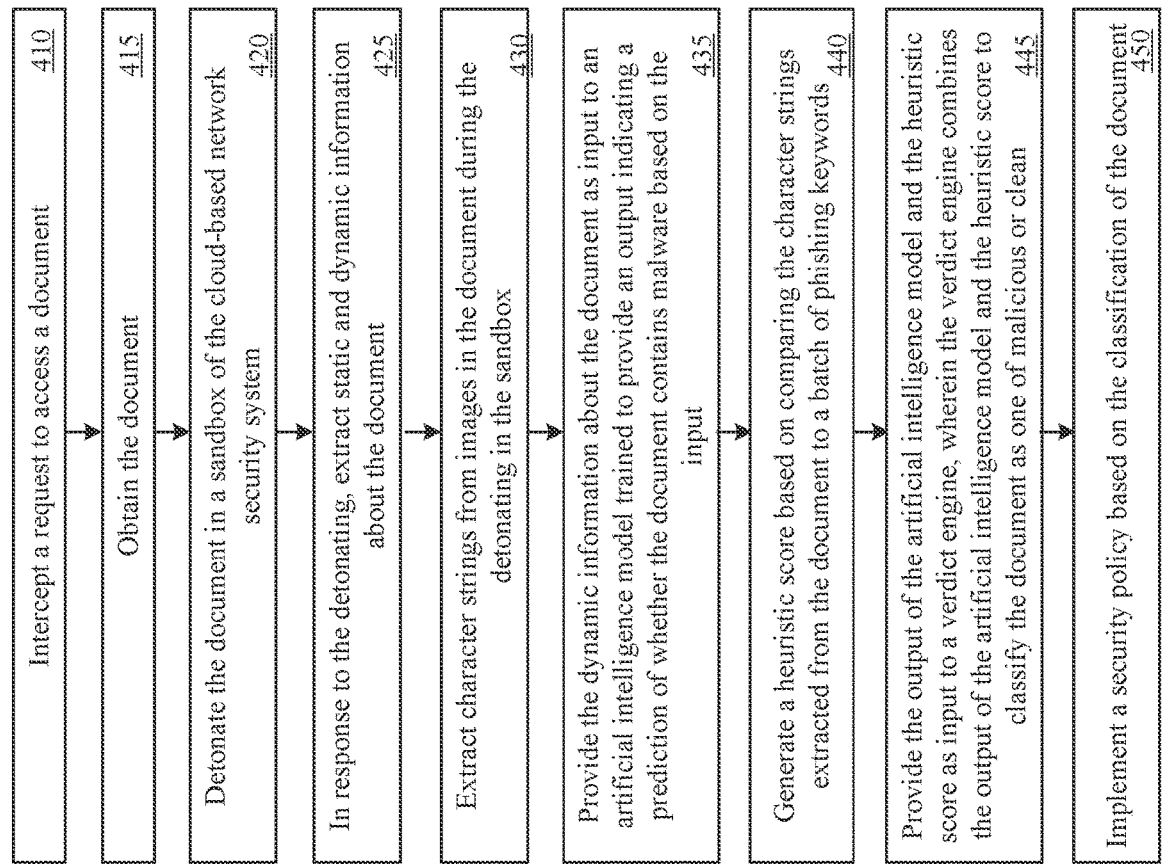
FIG. 4 illustrates a method of detecting malware in a document using a sandbox, according to some embodiments.

FIG. 4 illustrates method 400 for securing outgoing transactions requesting document access using network security system 125 as described above. Method 400 may be performed by network security system 125 in a cloud-based implementation or an on-premises implementation. While specific steps are shown, network security system 125 may include additional functionality, and more or fewer steps than shown in method 400 may be performed. Method 400 begins with step 410 where a request to access a document is intercepted. For example, network security system 125 may intercept outgoing transaction 205. Ingest engine 210 may analyze outgoing transaction 205 and determine that outgoing transaction 205 requests access to a document from a destination domain server 120.

At step 415, the document is obtained. For example, file retriever 215 may retrieve the file from the addressed destination domain server 120. In some embodiments, the user credentials used for outgoing transaction 205 may be used to obtain the file.

At step 420, the document is detonated (i.e., opened) in a sandbox of the network security system. For example, file detonator 220 may open the file in sandbox 130.

At step 425, in response to detonating the document, dynamic information about the document is extracted. Static information may also be extracted. For example, processes running in sandbox 130 may extract behavior feature data, signature data, process data, and the like. The processes may generate a report providing the relevant information. In some embodiments, data analyzer 225 may obtain the report such that data analyzer 225 retrieves all the data for analyzing whether the document includes malware. Data analyzer 225 can then extract the relevant data from the report. In some embodiments, data analyzer 225 probes sandbox 130 while the document is opened and extracts and obtains the information directly including the static and dynamic data.

At step 430, character strings from images in the document are extracted while the document is open in the sandbox. For example, OCR technology may be used to extract character strings from images in the document. In some embodiments, a process within sandbox 130 is configured to launch the OCR technology and provide the information in a report (e.g., the same report providing the static and dynamic data or a different report).

At step 435, the dynamic information about the document is provided as input to an artificial intelligence model trained to provide an output indicating a prediction of whether the document contains malware based on the input. For example, data analyzer 225 generates feature vector 305 and provides it as input to AI model 230. AI model 230 is trained to generate threat score 315 as output. In some embodiments, the static information is also provided as a portion of the input to the artificial intelligence model.

At step 440, a heuristic score is generated based on comparing the character strings extracted from images in the document to a batch of phishing keywords. For example, data analyzer 225 sends character strings 310 to heuristic analyzer 235 to compare character strings 310 to a batch of phishing keywords and phrases (collectively phishing keywords). Heuristic analyzer 235 generates heuristic score 320. Heuristic score may be a count of the matches, a weighted count of the matches and partial matches, a number indicating a heuristic trigger is triggered or not (e.g., the count of matches exceeds a threshold heuristic value), or any value that indicates a likelihood that the document includes malware based on the comparison of character strings 310 to the batch of phishing keywords.

At step 445, the output of the artificial intelligence model and the heuristic score are input to a verdict engine that combines the output and the heuristic score to classify the document as either clean or malicious. For example, threat score 315 and heuristic score 320 are input to verdict engine 240, which uses them to generate classification 325.

At step 450, a security policy is implemented based on the classification of the document. For example, security policy enforcer 140 may implement one or more security policies on outgoing transaction 205 based on whether verdict engine 240 provided classification 325 indicating the document was clean or malicious. If, for example, the document is classified as clean, security policy enforcer 140 may implement different security policies than if the document is classified as malicious. As one example, if classified as malicious, security policy enforcer 140 may block transmission of outgoing transaction 205. However, if classified as clean, security policy enforcer 140 may apply further security policies to outgoing transaction.

Figure 5:
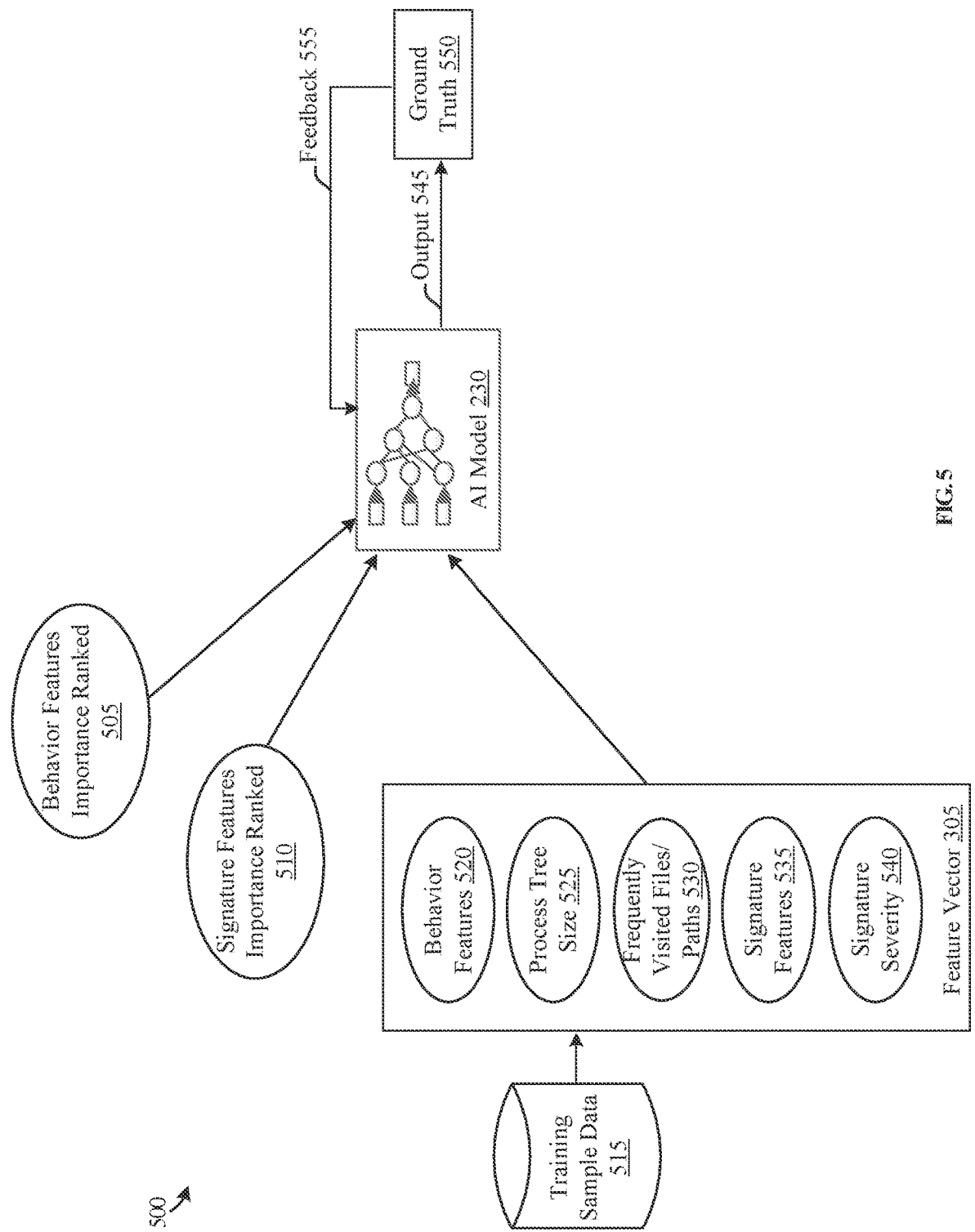
FIG. 5 illustrates a training system for training an artificial intelligence model for predicting malware, according to some embodiments.

FIG. 5 illustrates a simplified training model 500 depicting training data provided to AI model 230 for training and the feedback loop. To begin, behavior features may be importance ranked and the information for importance ranked behavior features 505 may be embedded in AI model 230. Similarly, signature features (i.e., signatures) may be importance ranked, and importance ranked signature features 510 may be embedded in AI model 230.

Figure 6:
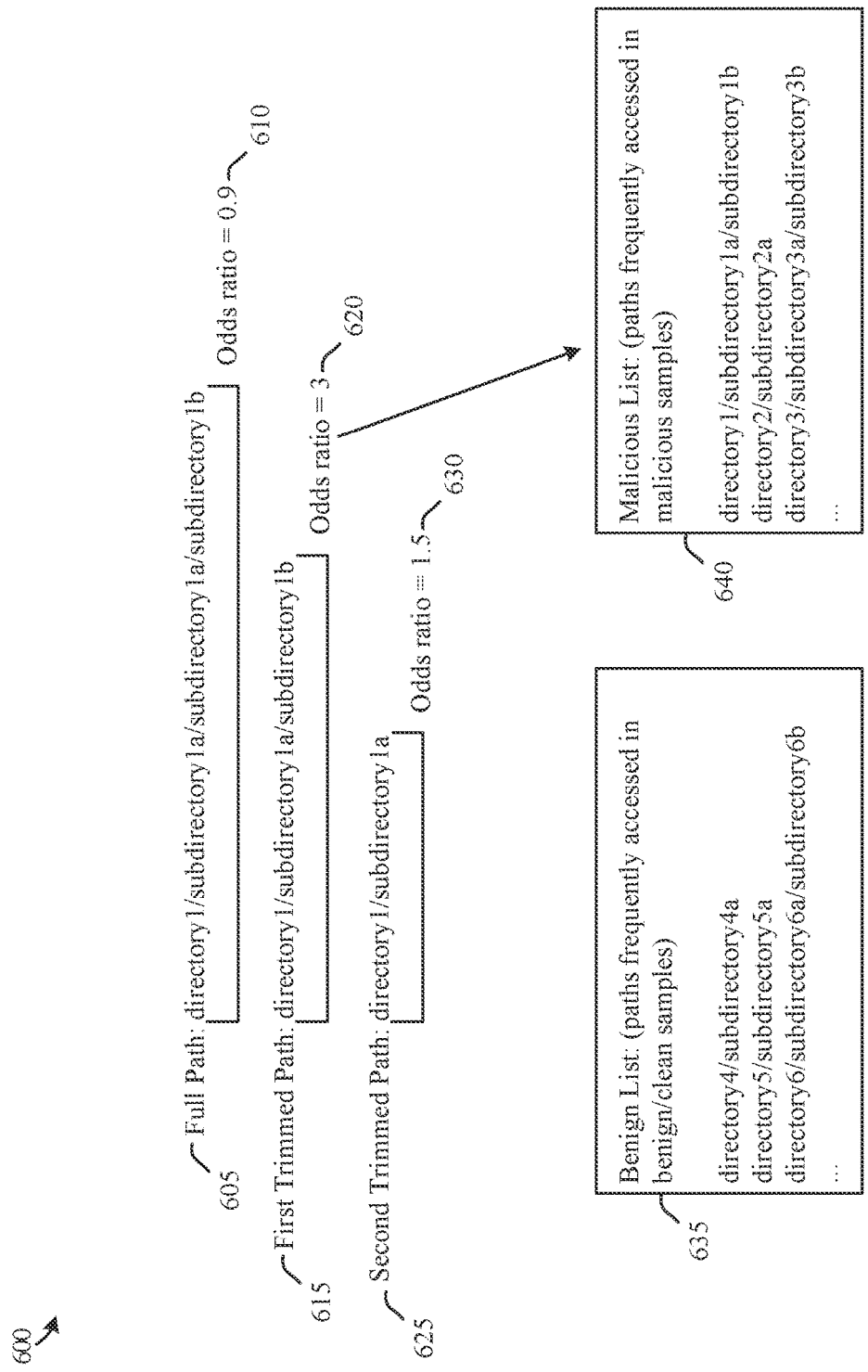
FIG. 6 illustrates frequently visited path training data, according to some embodiments.

After initial setup, including identifying frequently visited files and paths that are discussed in more detail with respect to FIG. 6, training sample data 515 is used to further train AI model 230. The training samples include documents, some of which include malware. For cach training sample, feature vector 305 is generated based on opening (i.e., accessing or detonating) the document in sandbox 130. Feature vector 305 was discussed with respect to FIG. 3. To expand on this discussion, each feature vector 305 includes behavior features 520, process tree size 525, frequently visited files and paths 530, signature features 535, and signature severity 540.

Behavior features 520 may include any or all of the behavior features discussed in the table above with respect to FIG. 2. Other behavior features may also be included in some embodiments. The behavior features 520 may be included in feature vector 305 by using a single dimension to indicate a count of the behavior features that are exhibited by the document when detonated. In some embodiments, a dimension for each behavior feature is included, and the corresponding dimension includes a value that indicates whether the behavior feature was exhibited by the document when detonated.

Process tree size 525 may be a dimension of feature vector 305 that indicates an integer value of the size of the process tree spawned by detonating the document. The process tree size may indicate malware if, for example, a large process tree is spawned.

Frequently visited files and paths 530 may be identified and included as one or more dimensions of feature vector 305. Specifically, known frequently visited files and paths of malicious files that may exhibit particular behavior features with respect to those known paths and files are used to generate a count for a one dimension of feature vector 305. In other words, when a document exhibits a behavior feature known to be often exhibited in a known path (e.g., file_created in path: directory1/subdirectory2/subdirectory3), the count increases by one. Similarly, known frequently visited files and paths of benign files that exhibit particular behavior features with respect to those known paths and files are used to generate a count for another dimension of feature vector 305. Those dimensions make up the frequently visited files and paths 530 data included in feature vector 305. Additional details about how the frequently visited files and paths are identified for inclusion is described with respect to FIG. 6.

Signature features 535 includes data regarding signatures that are invoked by detonation of the document. Each signature may be associated with a corresponding dimension of feature vector 305. When the signature is invoked, the dimension indicates the invocation (e.g., has a value of one (1)), and when the signature is not invoked, the dimension indicates no invocation (e.g., has a value of zero (0)). The list of signatures included may be based on known signatures that are published and known for network security.

Signature severity 540 may include the severity information for the signatures invoked by the document. For example, each signature that is tracked in signature features 535 includes a severity score. A dimension of feature vector 305 may include a sum of the signature severity scores for the signatures invoked by the document.

Once feature vector 305 is generated for a given training data sample from training sample data 515, it is input to AI model 230. AI model 230 generates output 545 (e.g., threat score 315). The training system compares output 545 against the ground truth 550 for the given training sample. For example, each training sample may be labeled as malicious or clean. When output 545 indicates that the training sample is malicious, but the ground truth 550 indicates the document is clean, the AI model 230 is wrong, and that information is provided as feedback 555 to AI model 230. Similarly, when AI model 230 is correct, feedback 555 indicates the correct classification. AI model 230 is trained until it reaches an acceptable level of accuracy. Once trained, it is deployed to use in a production environment.

FIG. 6 illustrates one sample 600 of identifying and using frequently visited paths and files (e.g., frequently visited files and paths 530) for training and in production. The paths for malicious and clean files are identified by looking at a large set of documents and analyzing the frequently visited paths and files for known clean and known malicious documents. The theory is that malicious documents are more likely to access (e.g., load, read, open delete, or the like) some directories and files which are less frequently accessed by benign files. However, trimmed subdirectories provides a more robust analysis because it avoids failing to see the frequently visited paths when the full path is unique to one or a few samples of malware.

Once a set of paths are identified as visited by benign and malicious samples, the paths are analyzed. The sample 600 shown in FIG. 6 illustrates the process. First, the full path 605 is analyzed, and an odds ratio 610 is calculated. Then, the first trimmed path 615 is identified by removing the last subdirectory (i.e., subdirectory1b). The odds ratio 620 is calculated for the first trimmed path 615. The second trimmed path 625 is similarly generated and the odds ratio 630 calculated. This is done for each full path and trimmed path identified for analysis.

Each trimmed path is scored with an odds ratio as shown in FIG. 6. The odds ratio is the odds of seeing a trimmed path visited by a malicious file divided by the odds the trimmed path is visited by a benign file. If the score exceeds a threshold value (e.g., 2), it is included in the malicious list 640. If the score falls below another threshold value (e.g., 0.5) it is included in the benign list 635. In this way, the meaningful paths are identified. As shown in sample 600, first trimmed path 615 has an odds ratio 620 with a value of three (3). Accordingly, first trimmed path 615 is included in malicious list 640.

The odds ratio is calculated by dividing odds1 by odds2 (i.e., odds ratio=odds1/odds2). Further, a value M0 is calculated indicating the total number of malicious samples that visited a specific trimmed path (e.g., the first trimmed path 615). A second value M1 is calculated indicating the number of malicious samples that did not visit the specific trimmed path. Another value B0 is calculated indicating the total number of benign samples that visited the trimmed path, and a value B1 is calculated indicating the total number of benign samples that did not visit the trimmed path. Odds1 is calculated as M0 divided by M1 (i.e., odds1=M0/M1), and Odds2 is calculated as B0 divided by B1 (i.e., odds2=B0/B1).

In addition to generating the malicious list 640 and the benign list 635 indicating trimmed paths and files frequently visited by the malicious and benign documents, a list of behavior features for each frequently visited path in the malicious list 640 can be identified, and a list of behavior features for each frequently visited path in the benign list 635 can be identified. For example, behavior features including file_exists, file_created, file_failed, file_written, file_recreated, file_read, and file_opened may be included in the behavior features relevant to the frequently visited paths and files in benign list 635. Behavior features including directory_enumerated, file_exists, file_opened file_created, file_failed, file_read, directory_created, file_written, file_deleted, directory_removed, and file_recreated may be included in the behavior features relevant to the frequently visited paths and files in malicious list 640.

Accordingly, to generate frequently visited files and paths 530 in feature vector 305 for each training and production sample, the dynamic information is collected by detonating the document in sandbox 130. A count of how many times the document performs one of the relevant behavior features in a path of the malicious list 640 may be one dimension of feature vector 305. A count of how many times the document performs one of the relevant behavior features in a path of the benign list 635 may be another dimension of feature vector 305.

FIG. 7 illustrates a computing device 700. The computing device 700 includes various components not included for ease of description in other computing devices discussed herein including, for example, endpoints 105, network security system 125, and destination domain servers 120. Accordingly, computing device 700 may be endpoints 105, network security system 125, or destination domain servers 120 by incorporating the functionality described in each.

Computing device 700 is suitable for implementing processing operations described herein related to security enforcement and document malware detection, with which aspects of the present disclosure may be practiced. Computing device 700 may be configured to implement processing operations of any component described herein including the user system components (e.g., endpoints 105 of FIG. 1). As such, computing device 700 may be configured as a specific purpose computing device that executes specific processing operations to solve the technical problems described herein including those pertaining to security enforcement and document malware detection. Computing device 700 may be implemented as a single apparatus, system, or device or may be implemented in a distributed manner as multiple apparatuses, systems, or devices. For example, computing device 700 may comprise one or more computing devices that execute processing for applications and/or services over a distributed network to enable execution of processing operations described herein over one or more applications or services. Computing device 700 may comprise a collection of devices executing processing for front-end applications/services, back-end applications/services, or a combination thereof. Computing device 700 includes, but is not limited to, a bus 705 communicably coupling processors 710, output devices 715, communication interfaces 720, input devices 725, power supply 730, and memory 735.

Non-limiting examples of computing device 700 include smart phones, laptops, tablets, PDAs, desktop computers, servers, blade servers, cloud servers, smart computing devices including television devices and wearable computing devices including VR devices and AR devices, e-reader devices, gaming consoles and conferencing systems, among other non-limiting examples.

Processors 710 may include general processors, specialized processors such as graphical processing units (GPUs) and digital signal processors (DSPs), or a combination. Processors 710 may load and execute software 740 from memory 735. Software 740 may include one or more software components such as sandbox 130, AI malware detection engine 135, security policy enforcer 140, endpoint routing client 110, or any combination including other software components. In some examples, computing device 700 may be connected to other computing devices (e.g., display device, audio devices, servers, mobile devices, remote devices, VR devices, AR devices, or the like) to further enable processing operations to be executed. When executed by processors 710, software 740 directs processors 710 to operate as described herein for at least the various processes, operational scenarios, and sequences discussed in the foregoing implementations. Computing device 700 may optionally include additional devices, features, or functionality not discussed for purposes of brevity. For example, software 740 may include an operating system that is executed on computing device 700. Computing device 700 may further be utilized as endpoints 105 or any of the cloud computing systems in security environment 100 (FIG. 1) including network security system 125 or may execute the method 400 of FIG. 4.

Referring still to FIG. 7, processors 710 may include a processor or microprocessor and other circuitry that retrieves and executes software 740 from memory 735. Processors 710 may be implemented within a single processing device but may also be distributed across multiple processing devices or sub-systems that cooperate in executing program instructions. Examples of processors 710 include general purpose central processing units, microprocessors, graphical processing units, application specific processors, sound cards, speakers and logic devices, gaming devices, VR devices, AR devices as well as any other type of processing devices, combinations, or variations thereof.

Memory 735 may include any computer-readable storage device readable by processors 710 and capable of storing software 740 and data stores 745. Data stores 745 may include data stores that maintain security policies used by security policy enforcer 140, for example. Memory 735 may include volatile and nonvolatile, removable and non-removable media implemented in any method or technology for storage of information, such as computer readable instructions, data structures, program modules, cache memory, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer-readable storage device a propagated signal.

In addition to computer-readable storage devices, in some implementations, memory 735 may also include computer-readable communication media over which at least some of software 740 may be communicated internally or externally. Memory 735 may be implemented as a single storage device but may also be implemented across multiple storage devices or sub-systems co-located or distributed relative to each other. Memory 735 may include additional elements, such as a controller, capable of communicating with processors 710 or possibly other systems.

Software 740 may be implemented in program instructions and among other functions may, when executed by processors 710, direct processors 710 to operate as described with respect to the various operational scenarios, sequences, and processes illustrated herein. For example, software 740 may include program instructions for executing document malware detection (e.g., AI malware detection engine 135, AI model 230, heuristic analyzer 235, verdict engine 240, data analyzer 225, file retriever 215, file detonator 220, sandbox 130) or security policy enforcement (e.g., security policy enforcer 140) as described herein.

In particular, the program instructions may include various components or modules that cooperate or otherwise interact to conduct the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or other application software. Software 740 may also include firmware or some other form of machine-readable processing instructions executable by processors 710.

In general, software 740 may, when loaded into processors 710 and executed, transform a suitable apparatus, system, or device (of which computing device 700 is representative) overall from a general-purpose computing system into a special-purpose computing system customized to execute specific processing components described herein as well as process data and respond to queries. Indeed, encoding software 740 on memory 735 may transform the physical structure of memory 735. The specific transformation of the physical structure may depend on various factors in different implementations of this description. Examples of such factors may include, but are not limited to, the technology used to implement the storage media of memory 735 and whether the computer-storage media are characterized as primary or secondary storage, as well as other factors.

For example, if the computer readable storage device are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interfaces 720 may include communication connections and devices that allow for communication with other computing systems (not shown) over communication networks (not shown). Communication interfaces 720 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication interfaces 720 may also include associated user interface software executable by processors 710 in support of the various user input and output devices discussed below. Separately or in conjunction with each other and other hardware and software elements, the user interface software and user interface devices may support a graphical user interface, a natural user interface, or any other type of user interface, for example, which enables front-end processing and including rendering of user interfaces, such as a user interface that is used by a user on endpoint 105. Exemplary applications and services may further be configured to interface with processing components of computing device 700 that enable output of other types of signals (e.g., audio output, handwritten input) in conjunction with operation of exemplary applications or services (e.g., a collaborative communication application or service, electronic meeting application or service, or the like) described herein.

Input devices 725 may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices 715 may include a display, speakers, haptic devices, and the like. In some cases, the input and output devices may be combined in a single device, such as a display capable of displaying images and receiving touch gestures. The afore-mentioned user input and output devices are well known in the art and need not be discussed at length here.

Communication between computing device 700 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

The computing device 700 has a power supply 730, which may be implemented as one or more batteries. The power supply 730 may further include an external power source, such as an AC adapter or a powered docking cradle that supplements or recharges the batteries. In some embodiments, the power supply 730 may not include batteries and the power source may be an external power source such as an AC adapter.

The aforementioned discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

What is claimed is:

1. A computer-implemented method, comprising:
   intercepting, by a cloud-based network security system, a request to access a document;
   obtaining, by the cloud-based network security system, the document;
   detonating, by the cloud-based network security system, the document in a sandbox of the cloud-based network security system;
   in response to the detonating, extracting, by the cloud-based network security system, dynamic information about the document;
   extracting, by the cloud-based network security system, character strings from images in the document during the detonating in the sandbox;
   providing, by the cloud-based network security system, the dynamic information as input to an artificial intelligence model trained to provide an output indicating a prediction of whether the document contains malware based on the input;
   generating, by the cloud-based network security system, a heuristic score based on comparing the character strings extracted from the document to a batch of phishing keywords;
   providing, by the cloud-based network security system, the output of the artificial intelligence model and the heuristic score as input to a verdict engine, wherein the verdict engine combines the output of the artificial intelligence model and the heuristic score to classify the document as one of malicious or clean; and
   implementing, by the cloud-based network security system, a security policy based at least in part on the classification of the document.

2. The computer-implemented method of claim 1, wherein the extracting the dynamic information about the document comprises:
   analyzing behavior of the document during detonation in the sandbox; and
   extracting data from the behavior, wherein the dynamic information about the document comprises:
      a set of behavior features of the document exhibited during the detonating,
      a size of a process tree spawned by the detonating, and
      a set of signature features exhibited during the detonating.

3. The computer-implemented method of claim 2, wherein the set of behavior features comprises at least one of: visited files, visited paths, and pathways explored by processes in the sandbox.

4. The computer-implemented method of claim 2, wherein the set of signature features comprises:
   a signature vector having a dimension for each of a plurality of software signatures, wherein a value of each dimension indicates whether the document invoked the respective software signature in the sandbox, and
   severity scores for each of the software signatures the document invoked.

5. The computer-implemented method of claim 2, wherein the providing the dynamic information as input comprises:
   generating a feature vector representing at least a portion of the dynamic information; and
   providing the feature vector as the input to the artificial intelligence model.

6. The computer-implemented method of claim 1, wherein the artificial intelligence model comprises a gradient boosting tree algorithm.

7. The computer-implemented method of claim 1, wherein the extracting the character strings from the images in the document comprises analyzing, by the cloud-based network security system in the sandbox, the document with optical character recognition.

8. The computer-implemented method of claim 1, wherein the heuristic score comprises a count of all matches identified during the comparison of the character strings to the batch of the phishing keywords.

9. The computer-implemented method of claim 1, wherein:
   a heuristic rule is triggered based on the heuristic score exceeding a threshold heuristic value;
   the output of the artificial intelligence model comprises a prediction score indicating the prediction; and
   the verdict engine:
      classifies document as malicious based on:
         determining the heuristic rule is triggered; and
         the prediction score exceeds a pre-defined prediction threshold value, and
      classifies the document as clean based on:
         determining the heuristic rule is not triggered; or
         the prediction score does not exceed the pre-defined prediction threshold value.

10. The computer-implemented method of claim 1, further comprising:
    extracting static information about the document, wherein the providing the dynamic information as input to the artificial intelligence model comprises providing both the dynamic information and the static information as the input to the artificial intelligence model.

11. A cloud-based network security system, comprising:
    one or more processors; and
    one or more memories having stored thereon instructions that, upon execution by the one or more processors, cause the one or more processors to:
       intercept a request to access a document;
       obtain the document;
       detonate the document in a sandbox of the cloud-based network security system;
       in response to the detonating, extract dynamic information about the document;
       extract character strings from images in the document during the detonating in the sandbox;

provide the dynamic information as input to an artificial intelligence model trained to provide an output indicating a prediction of whether the document contains malware based on the input;

generate a heuristic score based on comparing the character strings extracted from the document to a batch of phishing keywords;

provide the output of the artificial intelligence model and the heuristic score as input to a verdict engine, wherein the verdict engine combines the output of the artificial intelligence model and the heuristic score to classify the document as one of malicious or clean; and implement a security policy based on the classification of the document.

12. The cloud-based network security system of claim 11, wherein the instructions to extract the dynamic information about the document comprise further instructions that, upon execution by the one or more processors, cause the one or more processors to:

analyze behavior of the document during detonation in the sandbox; and extract data from the behavior, wherein the dynamic information about the document comprises:
 a set of behavior features of the document exhibited during the detonating,
 a size of a process tree spawned by the detonating, and
 a set of signature features of the document exhibited during the detonating.

13. The cloud-based network security system of claim 12, wherein the set of behavior features comprises at least one of: visited files, visited paths, and pathways explored by processes in the sandbox.

14. The cloud-based network security system of claim 12, wherein the set of signature features comprises:
 a signature vector having a dimension for each of a plurality of software signatures, wherein a value of each dimension indicates whether the document invoked the respective software signature in the sandbox, and
 severity scores for each of the software signatures the document invoked.

15. The cloud-based network security system of claim 12, wherein the instructions to provide the dynamic information as input comprise further instructions that, upon execution by the one or more processors, cause the one or more processors to:

generate a feature vector representing the dynamic information; and provide the feature vector as the input to the artificial intelligence model.

16. The cloud-based network security system of claim 11, wherein the artificial intelligence model comprises a gradient boosting tree algorithm.

17. The cloud-based network security system of claim 11, wherein the instructions to extract the character strings from the images in the document comprise further instructions that, upon execution by the one or more processors, cause the one or more processors to:

analyze the document during the detonation in the sandbox with optical character recognition.

18. The cloud-based network security system of claim 11, wherein the heuristic score comprises a count of all matches identified during the comparison of the character strings to the batch of phishing keywords.

19. The cloud-based network security system of claim 11, wherein:

a heuristic rule is triggered based on the heuristic score exceeding a threshold heuristic value;

the output of the artificial intelligence model comprises a prediction score indicating the prediction; and the verdict engine comprises instructions that, upon execution by the one or more processors, cause the one or more processors to:

classify document as malicious based on:
 determining the heuristic rule is triggered; and
 the prediction score exceeds a pre-defined prediction threshold value, and classify the document as clean based on:
 determining the heuristic rule is not triggered; or
 the prediction score does not exceed the pre-defined prediction threshold value.

20. The cloud-based network security system of claim 11, wherein the instructions comprise further instructions that, upon execution by the one or more processors, cause the one or more processors to:

extract static data about the document; and provide both the static information and the dynamic information as the input to the artificial intelligence model.

* * * * *